United States Patent [19]

Parola

[11] Patent Number: 5,327,492
[45] Date of Patent: Jul. 5, 1994

[54] METHOD FOR SELECTIVELY CONTROLLING THE PROPAGATION OF DUAL-TONE MULTI-FREQUENCY SIGNALS WITHIN A TELECOMMUNICATIONS NETWORK

[75] Inventor: Dario L. Parola, Matawan, N.J.

[73] Assignee: AT&T Bell Laboratories, Murray Hill, N.J.

[21] Appl. No.: 876,555

[22] Filed: Apr. 30, 1992

[51] Int. Cl.$^5$ .......................................... H04M 1/00
[52] U.S. Cl. ................................. 379/361; 379/283; 379/354; 379/386; 379/351; 379/95; 379/199; 370/110.1
[58] Field of Search ............... 379/283, 361, 354, 386, 379/351, 199, 95; 370/110.1

[56] References Cited

U.S. PATENT DOCUMENTS

| | | | |
|---|---|---|---|
| 4,219,699 | 8/1980 | Nilssen et al. | 379/351 |
| 4,621,354 | 11/1986 | Jones, Jr. et al. | 379/283 |
| 4,626,628 | 12/1986 | Ramsaran et al. | 379/283 |
| 4,866,762 | 9/1989 | Pintar | 379/200 |
| 5,063,563 | 11/1991 | Ikeda | 370/110.1 |

Primary Examiner—James L. Dwyer
Assistant Examiner—Jacques M. Saint-Surin
Attorney, Agent, or Firm—R. P. Marley

[57] ABSTRACT

A method for monitoring a network communications channel to detect specific DTMF triggers transmitted by a network user during either a pre-answer or a post-answer period of a call supported by the channel, and, in response to the detected DTMF triggers, controllably prohibiting the propagation of subsequent DTMF signals transmitted over the channel by the network user. Specifically, possible disruption of a communication between the network user and other parties caused by transmission of DTMF signals is eliminated by advantageously transmitting the DTMF triggers during the pre-answer period of a call. Furthermore, another deficiency of prior network-based arrangements for restricting the propagation of DTMF signals is overcome, as the invention may be practiced without the introduction of any significant propagation delay to a network.

14 Claims, 10 Drawing Sheets

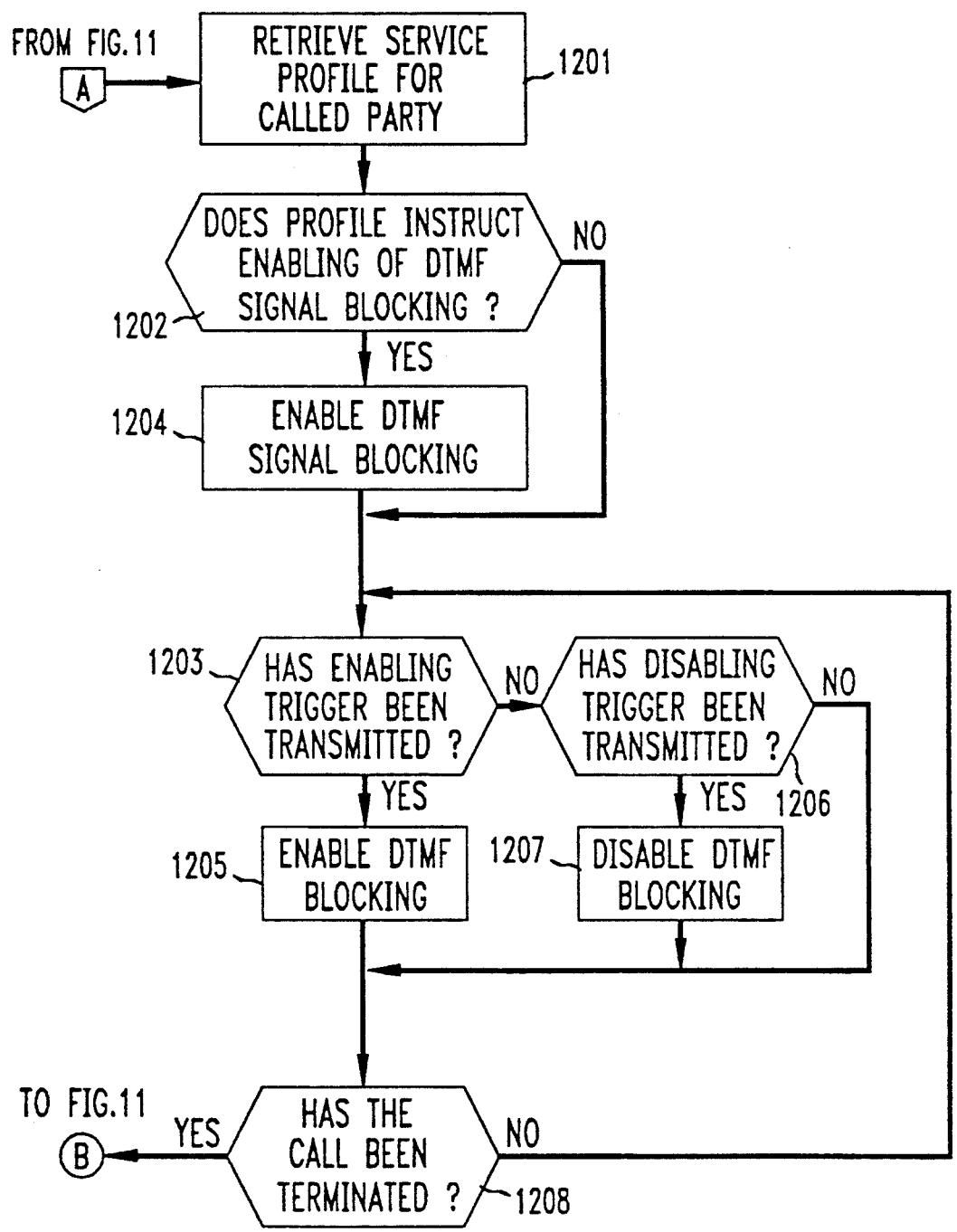

5,327,492

METHOD FOR SELECTIVELY CONTROLLING THE PROPAGATION OF DUAL-TONE MULTI-FREQUENCY SIGNALS WITHIN A TELECOMMUNICATIONS NETWORK

TECHNICAL FIELD

The invention relates to the transmission of Dual-Tone Multi-Frequency ("DTMF") signals within a telecommunication network.

BACKGROUND OF THE INVENTION

DTMF signals are employed within telecommunication systems to initiate calls, and facilitate control of certain services and/or equipment. The services and/or equipment may be both internal and external to the particular network facilitating a call. For example, codes called "triggers", comprised of one or more DTMF signals, allow network subscribers to control network-based services such as multi-party conferencing. Network subscribers may also need to transmit, via the network, DTMF triggers to equipment and services external to the network, such as answering machines and automated banking services.

Network subscribers have had little control as to the propagation of DTMF signals which they transmit, giving rise to a number of potential problems. For example, assume a network subscriber placed a call to a particular party via a network offering multi-party conferencing in response to a DTMF trigger received from the subscriber. During the course of the call, the conferencing feature allows a subscriber to instruct the network, via a transmitted DTMF trigger, to connect additional parties to the call. The transmitted DTMF trigger would be detected by network-based equipment which would perform the requested connection of the additional party or parties. Unfortunately, like any other audio band signal sent from the subscriber's telephone, the DTMF trigger would also be transmitted to the originally called party. Such audible signals would disrupt any communication with that first called party. For obvious reasons, such disruptions are undesirable.

Arbitrarily blocking all DTMF signals at some point within the network between the network-based equipment to which a network subscriber must transmit DTMF triggers, and the party with whom the subscriber is connected would prohibit DTMF signals from disrupting communications with that party. However, this blocking would also prevent a subscriber from transmitting DTMF triggers to equipment and services external to the network. Previously known network-based arrangements have provided for detecting and selectively blocking a limited number of unique triggers intended for equipment internal to a particular network, while allowing all other DTMF signals to propagate to parties/equipment external to the network. However, these arrangements are limited in their versatility, and cause unacceptable propagation delays within a network.

SUMMARY OF THE INVENTION

The aforementioned problems are solved, in accordance with the principles of the invention, by monitoring a network communications channel to detect specific DTMF triggers transmitted by a network user during either a pre-answer or a post-answer period of a call supported by the channel, and, in response to the detected DTMF triggers, controllably prohibiting the propagation of subsequent DTMF signals transmitted over the channel by the network user. Specifically, possible disruption of a communication between the network user and other parties caused by transmission of DTMF signals is eliminated by advantageously transmitting the DTMF triggers during the pre-answer period of a call. Furthermore, another deficiency of prior network-based arrangements for restricting the propagation of DTMF signals is overcome, as the invention may be practiced without the introduction of any significant propagation delay to a network.

BRIEF DESCRIPTION OF THE DRAWING

In the drawing:

FIGS. 11 and 12 form a flow diagram of operations required to enable a called party to selectively control the propagation of DTMF signals within the telecommunication system of FIG. 6.

DETAILED DESCRIPTION

Figure 1:
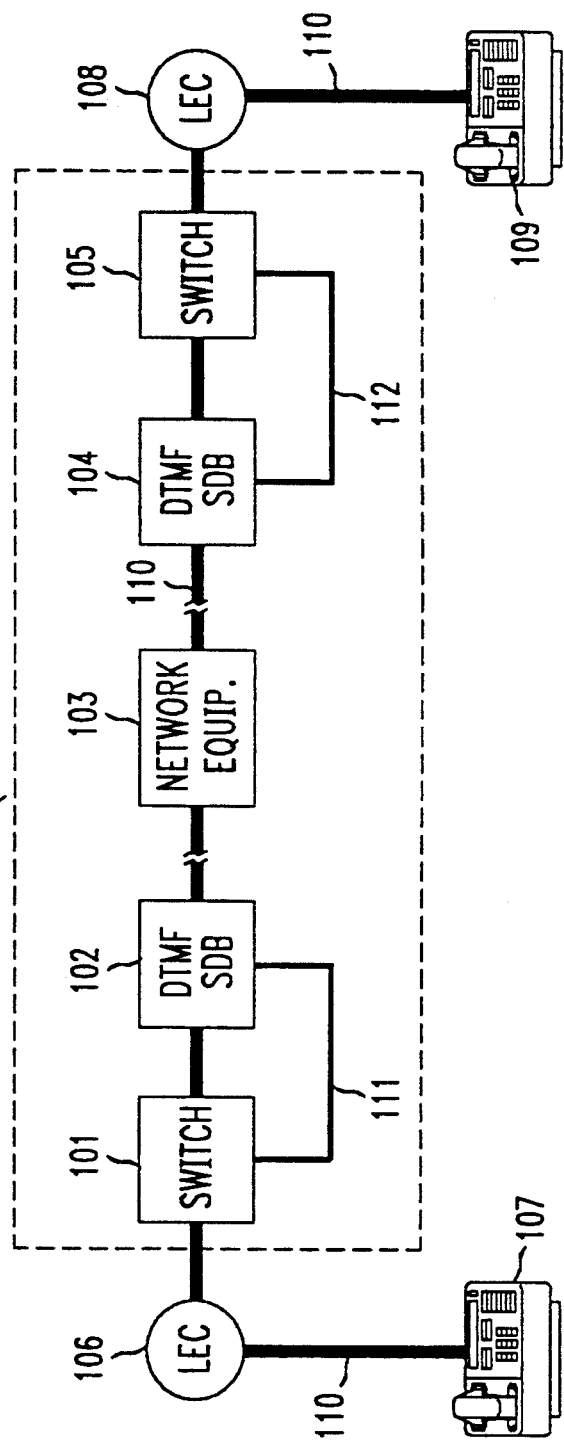
FIG. 1 shows, in simplified block diagram form, a telecommunication system incorporating the invention.

FIG. 1 is a simplified block diagram showing a telecommunication system which allows the practice of a particular method of this invention. Employing this system, a user may controllably prohibit (i.e., block) transmitted DTMF signals from being propagated to another network user, while still allowing the DTMF signals to reach network-based equipment. Specifically shown is telecommunication network 100, including switch 101, DTMF signal detector/blocker ("SDB") 102, DTMF-responsive network equipment 103, DTMF SDB 104, and switch 105. Also shown is Local Exchange Carrier ("LEC") 106, which provides switch 101 with a connection to network user 107, and LEC 108, which provides switch 105 with a connection to network user 109. Communications channel 110 is intended to support a call linking network users 107 and 109 via the LECs 106 and 108, and network 100. For purposes of illustration, communications channel 110 is shown as a bold line. Control messages used in practicing the invention are transmitted between DTMF SDB 102 and switch 101 via communication link 111. Similarly, control messages used in practicing the invention are transmitted between DTMF SDB 104 and switch 105 via communication link 112. Such communication links are well known in the art, and commonly employed in conjunction with electronic switches to facilitate the transfer of control messages to and from other equipment within the network. Network 100 is configured so that all calls for which switch 101 serves as a terminating switch are routed through DTMF SDB 102, and so that all calls for which switch 105 serves as a terminating switch are routed through DTMF SDB 104.

Figure 2:
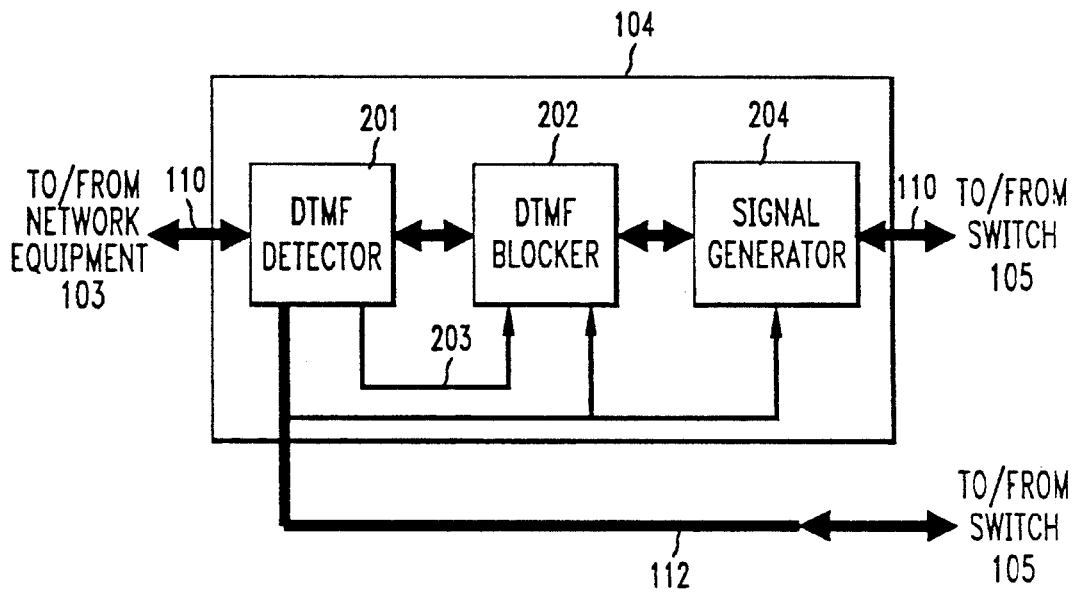
FIG. 2 is a functional block diagram of one of the DTMF signal detector/processors of FIG. 1.

FIG. 2 shows, in simplified form, the basic functional configuration of DTMF SDB 104 of the above-described network. As shown, DTMF SDB 104 includes DTMF detector 201, DTMF blocker 202, control line 203, and signal generator 204. DTMF detector 201 is adapted to monitor signals along communications channel 110 which are bound for switch 105, for the purpose of detecting either of two particular DTMF triggers: an "enabling" DTMF trigger, and a "disabling" DTMF trigger. Methods for detecting DTMF signals are known in the art, and a preferred method of performing such detection is disclosed in co-pending U.S. patent application Ser. No. 07/857,552, filed Mar. 23, 1992 (R. S. Dighe, Case 5). Each DTMF trigger consists of a unique series of one or more DTMF signals. In response to the detection of an enabling DTMF trigger or a disabling DTMF trigger, detector 201 transmits a signal indicative of the particular DTMF trigger detected to DTMF blocker 202 via control line 203. In addition, detector 201 also transmits a control message indicative of the detection of a DTMF trigger to switch 105, via communication link 112. DTMF blocker 202 is either enabled or disabled dependent upon the particular signals received via control line 203 and communication link 112. When enabled, DTMF blocker 202 is adapted to prohibit the propagation of DTMF signals received via communications channel 110; such DTMF blockers are known in the art. Signal generator 204 transmits an audible prompt signal along communications channel 110 to network user 107 (FIG. 1) in response to a signal received from switch 105 via communication link 112. This audible prompt serves as an indication to network user 107 that DTMF triggers may be keyed in. The configuration and operation of DTMF SDB 102 is similar to that of DTMF SDB 104, however, DTMF SDB 102 monitors signals along communications channel 110 which are bound for switch 101, and transmits control messages indicative of detected DTMF triggers to switch 101, via communication link 111.

Figure 3:
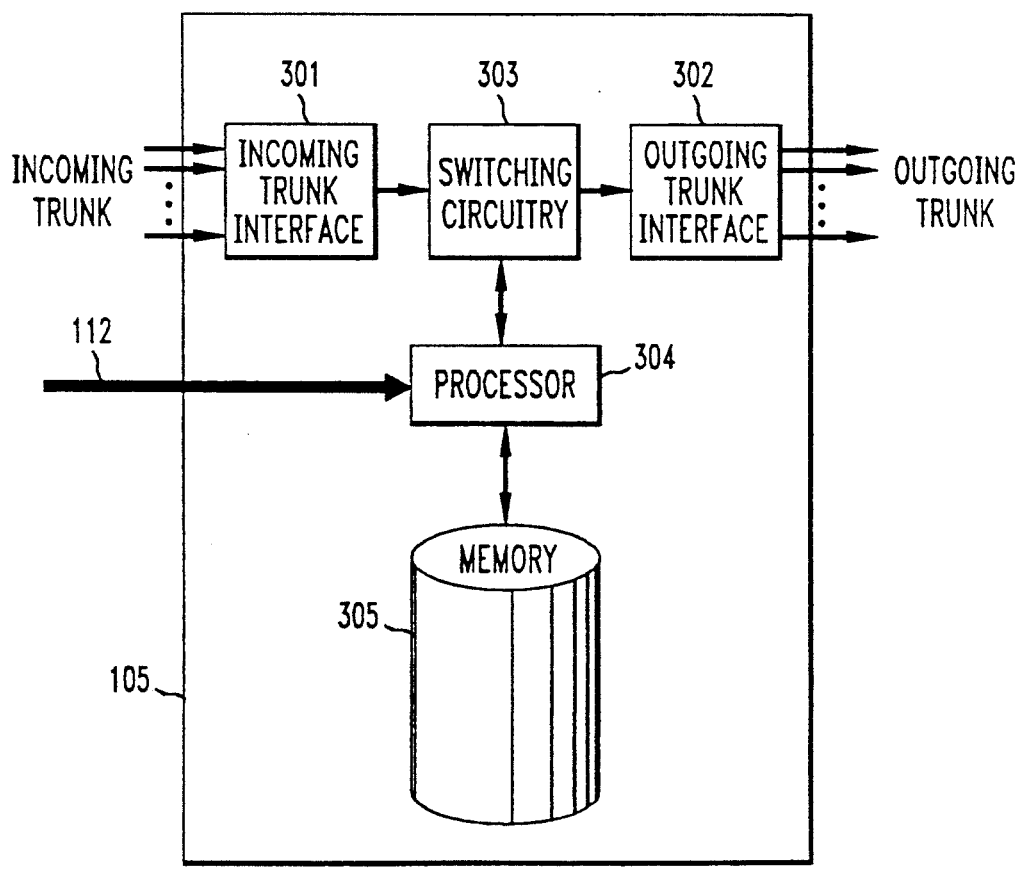
FIG. 3 shows, in simplified block diagram form, the internal architecture of one of the switches of FIG. 1.

Switches 101 and 105 in the above-described network are each program-controlled electronic switching systems. FIG. 3 is a functional block diagram of switch 105 illustrating the basic architecture of the switch. As shown, contained within switch 105 are the following components: incoming trunk interface 301, outgoing trunk interface 302, switching circuitry 303, processor 304, and memory 305. Memory 305 contains a program, the function of which with respect to the invention is described below. Memory 305 also contains call records for maintaining data associated with the various calls being handled by switch 105. Processor 304 is coupled to send and receive control messages via communication link 112. Switch 101 (FIG. 1) has the same basic architecture as switch 105, however, the processor contained within switch 101 receives control messages via communication link 111 (FIG. 1). Program-controlled electronic switching systems such as these are known and commercially available. An example of one such switching system is the 4 ESS TM switch manufactured by AT&T, and described in The Bell System Technical Journal, Vol. 56, No. 7, September 1977.

In practicing a particular method of the invention facilitated by the telecommunication system shown in FIG. 1, network user 107 initiates a call by entering the telephone number associated with network user 109. This call is routed via LEC 106 to network 100. As a function of the entered telephone number, switch 101 secures a voice channel connection to switch 105 in a standard manner. The voice channel connection is effected through DTMF-responsive network equipment 103 and DTMF SDB 104. However, prior to completing the voice channel connection to network user 109 via LEC 108, switch 105 sends a control message to signal generator 204 (FIG. 2) of DTMF SDB 104, which initiates the transmission of an audible prompt to network user 107. The time from the completion of a voice channel connection between network user 107 and switch 105, and the time at which a voice channel connection between network user 107 and network user 109 is completed, is the "pre-answer" period. Switch 105 then pauses for a pre-programmed interval, in accordance with the principles of the invention. This pre-programmed interval allows network user 107 time to key in a DTMF trigger. Switch 105 is directed to perform these functions as a result of the program stored within memory 305 (FIG. 3), and executed by processor 304 (FIG. 3). In addition, this program prohibits switch 105 from effecting a voice channel connection to LEG 108 until a control message indicative of the detection of a DTMF trigger has been received by processor 304 (FIG. 3) from DTMF SDB 104, via communication link 112, or until the pre-programmed pause interval has elapsed (whichever occurs first). Upon receipt of the audible prompt, network user 107 transmits an enabling DTMF trigger to DTMF SDB 104 via communications channel 110 (assuming network user 107 wished to prohibit subsequently transmitted DTMF signals from being propagated to network user 109). The transmitted enabling DTMF trigger is not detected by DTMF SDB 102, as DTMF SDB 102 only monitors signals bound for switch 101. As described above, DTMF SDB 104 prohibits the further propagation of DTMF signals received via communications channel 110 in response to detecting the enabling DTMF trigger, and transmits an indicative control message, via communication link 112, to switch 105. Upon receipt of this control message by switch 105, the program stored within memory 305 of switch 105 instructs processor 304 to complete a voice channel connection between network users 107 and 109, via LEC 108. All DTMF signals transmitted by network user 107 will be prohibited from reaching network user 109 for the remainder of the call, or until network user 107 transmits a disabling DTMF trigger. Furthermore, in accordance with the principles of the invention, even the DTMF trigger which initiated the blocking is kept from reaching network user 109, as it was transmitted prior to the establishment of a voice channel connection.

The transmission of a disabling DTMF trigger by network user 107 may be effected at any time during a call. This disabling DTMF trigger is transmitted to DTMF SDB 104 via communications channel 110. In response to detecting this disabling DTMF trigger, DTMF SDB 104 disables any restrictions on the propagation of subsequent DTMF signals received via communications channel 110. DTMF SDB 104 also transmits a control message indicative of DTMF trigger detection to switch 105, via communication link 112. However, as a voice channel connection already exists, the reception of this control message by switch 105 has no effect. All DTMF signals transmitted by network user 107 will now be allowed to reach network user 109 for the remainder of the call, or until network user 107 transmits an enabling DTMF trigger. In accordance with the principles of the invention, the DTMF trigger which disabled the blocking is kept from reaching network user 109, as it was transmitted while blocking was still in effect.

If in the above-described example, network user 107 did not wish to limit the propagation of DTMF signals, an enabling DTMF trigger would not have been transmitted in response to the audible prompt received from switch 105. Consequently, DTMF SDB 104 would not have transmitted a control message indicative of DTMF trigger detection to switch 105. Nevertheless, a voice channel connection between network users 107 and 109 would still be established by switch 105 after the pre-programmed pause interval had elapsed. This voice channel connection would permit the unrestricted propagation of DTMF signals to parties and equipment outside of network 100. However, by transmitting an enabling DTMF trigger, network user 107 could enable DTMF blocking at any time during the post-answer period of a call supported by this voice channel connection. DTMF SDB 104 would respond to this DTMF trigger in the same manner as it would to one received during the pre-answer period of a call, and limit the propagation of DTMF signals. This DTMF signal propagation limiting would remain in effect for the remainder of the call, or until a disabling DTMF trigger was received by DTMF SDB 104.

If network user 107 did not wish to initially restrict the propagation of DTMF signals, the completion of a voice channel connection could be expedited by immediately transmitting the disabling DTMF trigger upon receipt of the audible prompt from switch 105. This would cause DTMF SDB 104 to transmit a control message indicative of DTMF trigger detection to switch 105 via communication link 112. Upon receiving this control message, switch 105 is programmed to complete the voice channel connection between network users 107 and 109 via LEC 108. This voice channel connection would presumably be completed in slightly less time than one that would have resulted if network user 107 had simply allowed the pre-programmed pause interval to elapse without transmitting a DTMF trigger.

In each of the above-described examples, the network user employing the invention was the calling party. However, the invention may be practiced so as to allow the called party (network user 109 in above examples) to controllably prohibit transmitted DTMF signals from being propagated to the calling party (network user 107), while still allowing these signals to reach DTMF-responsive network equipment 103. In a manner similar to that employed by a calling network user, called network user 109 may transmit an enabling DTMF trigger to DTMF SDB 102, so as to controllably prohibit the propagation of DTMF signals to network user 107. This enabling DTMF trigger is transmitted via communications channel 110, but will not be detected by DTMF SDB 104, as DTMF SDB 104 only monitors signals bound for switch 105. DTMF SDB 102 operates in conjunction with switch 101 and communication link 111 in much the same manner as DTMF SDB 105 does with switch 105 and communication link 112. In response to detecting the enabling DTMF trigger, DTMF SDB 102 prohibits the further propagation of DTMF signals received via communications channel 110. DTMF SDB 102 also transmits a control message indicative of DTMF trigger detection to switch 101, via communication link 111. However, as a voice channel connection already exists, the reception of this control message by switch 101 has no effect. All DTMF signals transmitted by network user 109 will be prohibited from reaching network user 107 for the remainder of the call, or until network user 109 transmits a disabling DTMF trigger. The only constraint upon the use of the invention by a called party is the obvious limitation of not being able to initiate DTMF propagation restrictions during the pre-answer period of a call.

In all of the above-described examples, upon termination of a call all DTMF blocking associated with the voice channel connection that was supporting the call is disabled. This disabling is achieved as a function of the programming of the switches within network 100. When a call is terminated, the switch serving the calling party, and the switch serving the called party, each transmit a termination control message to their associated DTMF SDB. This terminating control message instructs the DTMF blocker within the DTMF SDB to disable DTMF blocking.

Figure 4:
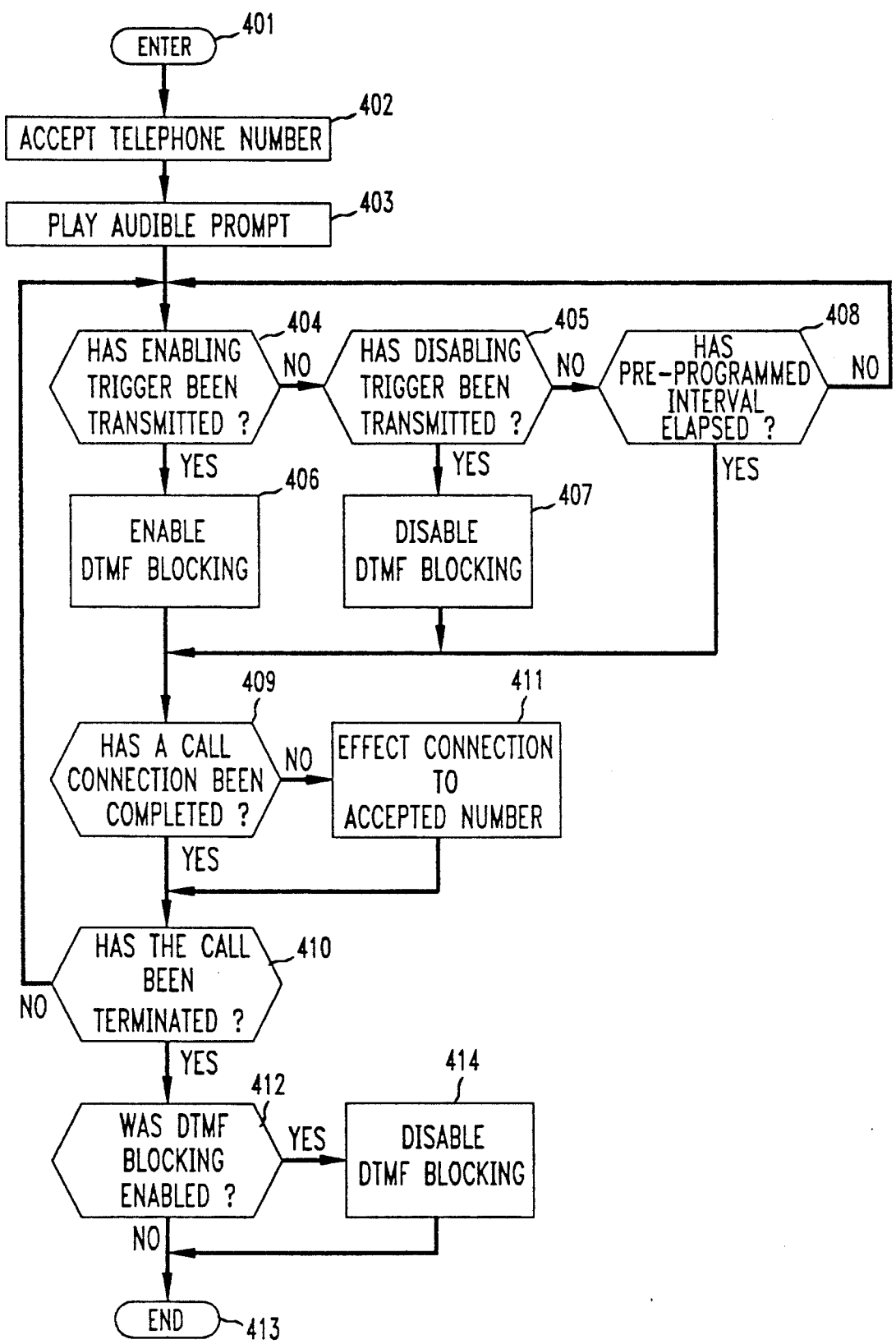
FIG. 4 is a flow diagram of operations required to enable a calling party to selectively control the propagation of DTMF signals within the telecommunication system of FIG. 1.

FIG. 4 is a flow diagram illustrating the sequence of operations effected within network 100 in providing the controllable DTMF propagation limiting service described above to a calling party. Accordingly, the sequence is entered into via step 401. Thereafter, a voice channel connection is initiated in operational block 402 by accepting the telephone number of the called party from the calling party. Operational block 403 then transmits an audible prompt to the calling party. Conditional branch point 404 tests to determine if the enabling DTMF trigger has been transmitted by the calling party. If the test result is YES, DTMF blocking is enabled in operational block 406. If the test result in step 404 is NO, conditional branch point 405 tests to determine if a disabling DTMF trigger has been transmitted by the calling party. If the test result is YES, DTMF blocking is disabled in operational block 407. If the result in step 405 is NO, conditional branch point 408 tests if the pre-programmed pause interval has elapsed. If the pre-programmed pause interval has not elapsed (a test result of NO), the operation continues with conditional branch point 404. If a test result of YES is obtained in step 408, conditional branch point 409 tests if a voice channel connection to the called party has been completed. If a call is in progress (a test result of YES), the operation branches to conditional branch point 410. If the test result in step 409 is NO, a voice channel connection to the called party is effected by operational block 411, which branches to conditional branch point 410. Conditional branch point 410 tests if the call has been terminated. If the test result is NO, the operation continues with conditional branch point 404. If the call has been terminated (a test result of YES), conditional branch point 412 tests if DTMF blocking had been enabled as of call termination. If this test result is NO, the operation is exited via step 413. If the result of the test in step 412 is YES, DTMF blocking is disabled in operational block 414, and then operation is terminated via step 412.

Figure 5:
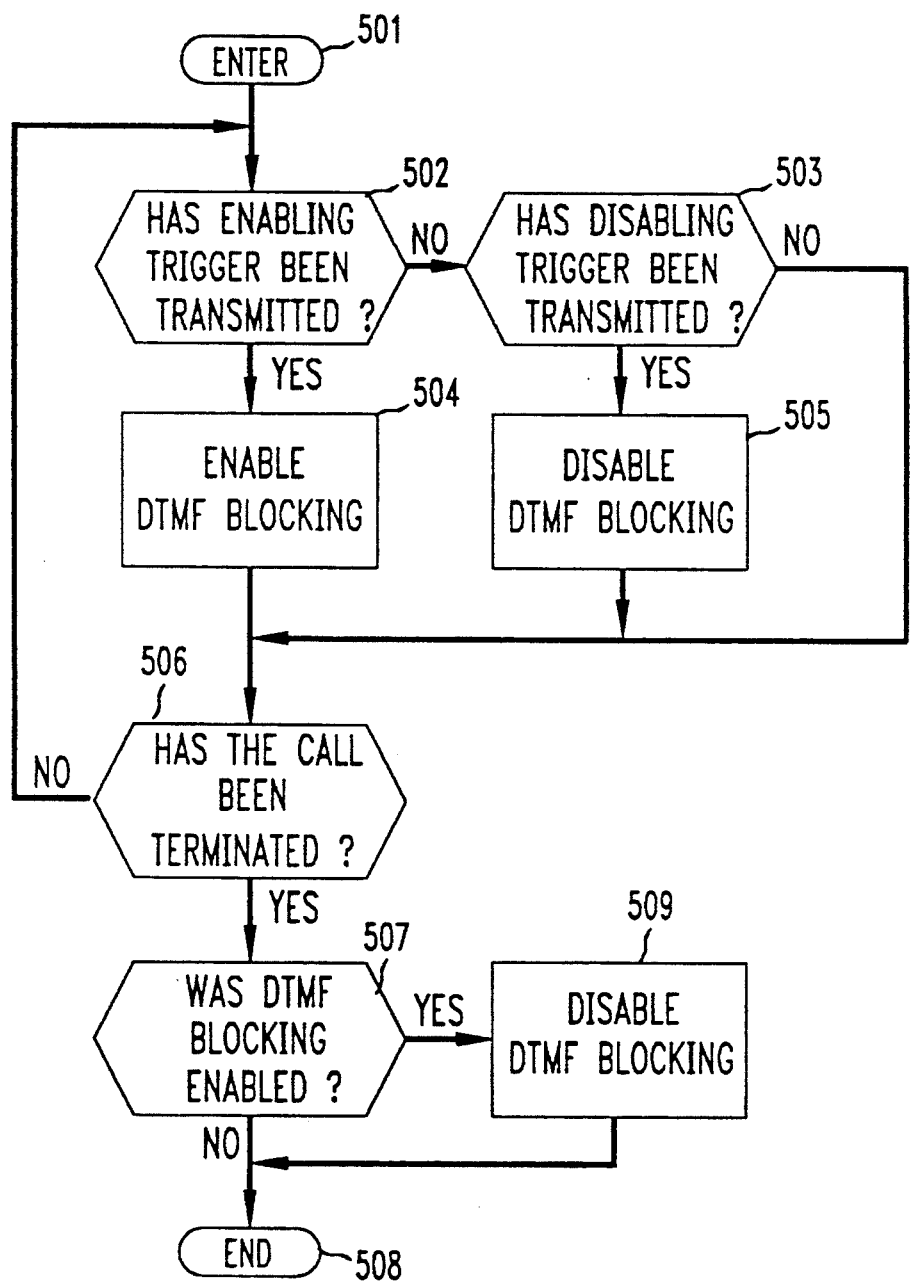
FIG. 5 is a flow diagram of operations required to enable a called party to selectively control the propagation of DTMF signals within the telecommunication system of FIG. 1.

FIG. 5 illustrates the sequence of operations effected within network 100 in providing the controllable DTMF propagation limiting service described above to a called party. The sequence is entered into via step 501, and then conditional branch point 502 tests to determine if the enabling DTMF trigger has been transmitted by the called party. If the test result is YES, DTMF blocking is enabled in operational block 504. If the test result in step 502 is NO, conditional branch point 503 tests to determine if the disabling DTMF trigger has been transmitted by the called party. If the test result is YES, DTMF blocking is disabled in operational block 505. If the test result in step 503 is NO, the operation continues with conditional branch point 506; operational blocks 504 and 505 also branch to conditional branch point 506. Conditional branch point 506 tests if the call has been terminated. If the call is still in progress (a test result of NO), the operation branches to conditional branch point 502. If a test result of YES is returned, conditional branch point 507 tests if DTMF blocking had been enabled as of call termination. If this test result is NO, the operation is exited via step 508. If the result of the test in step 507 is YES, DTMF blocking is disabled in operational block 509, and then operation is terminated via step 508.

Figure 6:
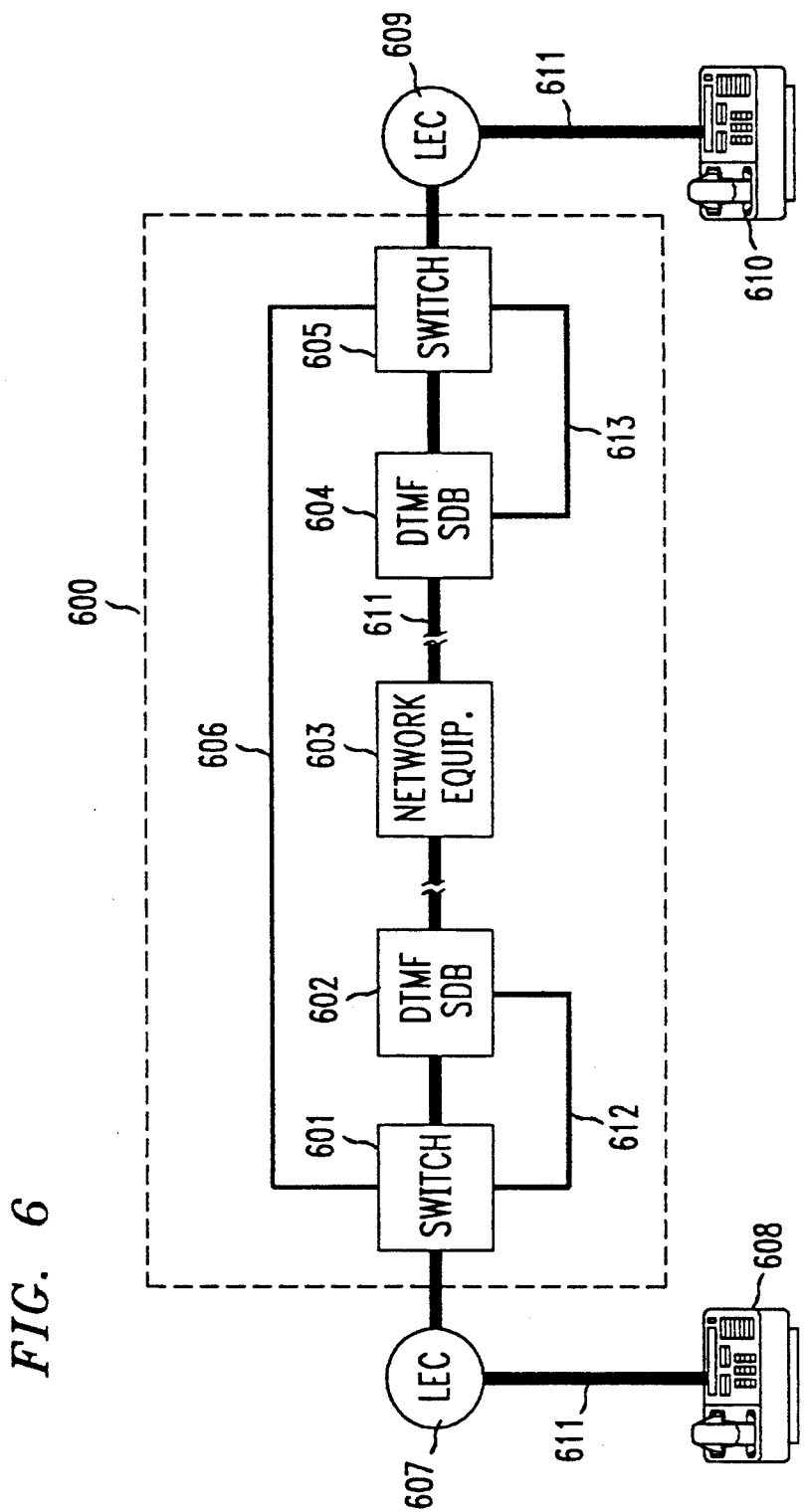
FIG. 6 shows, in simplified block diagram form, a second telecommunication system incorporating the invention.

A telecommunication network system facilitating the practice of yet another method of the invention is illustrated in FIG. 6. Specifically shown is telecommunication network 600, including switch 601, DTMF SDB 602, DTMF responsive network equipment 603, DTMF SDB 604, switch 605, and signaling system 606. Signaling system 606 is a common channel signalling system, such as a Signaling System 7, which is well known in the art. Also shown is LEC 607, which provides switch 601 with a voice channel connection to network user 608, and LEC 609, which provides switch 605 with a voice channel connection to network user 610. Also shown is communications channel 611, which is intended to support a call linking network users 608 and 610 via the LECs 607 and 609, and network 600. For purposes of illustration, communications channel 611 is shown as a bold line. Control messages used in practicing the invention are transmitted between DTMF SDB 602 and switch 601 via communication link 612. Similarly, control messages used in practicing the invention are transmitted between DTMF SDB 604 and switch 605 via communication link 613. Such communication links are well known in the art, and commonly employed in conjunction with electronic switches to facilitate the transfer of control messages between switches and other network equipment. Network 600 is configured so that all calls for which switch 601 serves as a terminating switch are routed through DTMF SDB 602, and so that all calls for which switch 605 serves as a terminating switch are routed through DTMF SDB 604.

Figure 7:
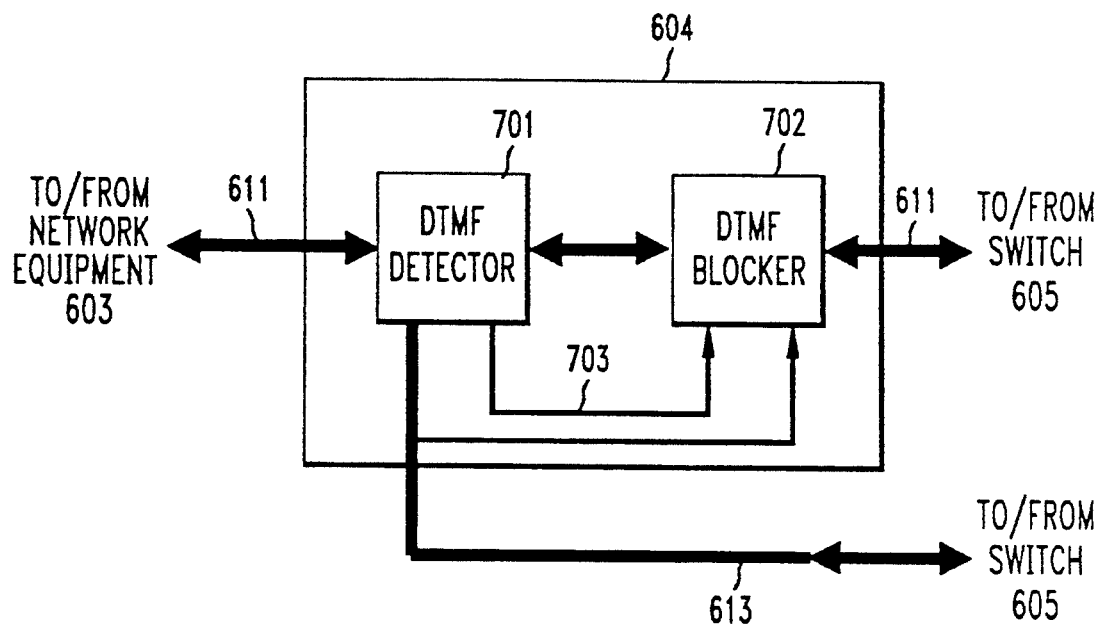
FIG. 7 is a functional block diagram of one of the DTMF signal detector/processor of FIG. 5.

FIG. 7 shows, in simplified form, the basic functional configuration of DTMF SDB 604 (FIG. 6) of the above-described network. As shown, DTMF SDB 604 (FIG. 6) includes DTMF detector 701, DTMF blocker 702, and control line 703. DTMF detector may be put into an active or inactive state as a function of control messages received from switch 605 (FIG. 6). When active, DTMF detector 701 monitors signals along communications channel 611 bound for switch 605 for the purpose of detecting the presence of either an enabling DTMF trigger, and/or a disabling DTMF trigger. Methods for detecting DTMF signals are known in the art. Each of these DTMF triggers consists of one or more DTMF signals. In response to the detection of an enabling DTMF trigger or a disabling DTMF trigger, detector 701 transmits a signal indicative of the particular DTMF trigger detected to DTMF blocker 702, via control line 703. DTMF blocker 702 is either enabled or disabled dependent upon the particular signal received. DTMF blocker 702 may also be enabled or disabled in response to control messages received from switch 605 (FIG. 6). When enabled, DTMF blocker 702 is adapted to prohibit the propagation of DTMF signals received via communications channel 611. The configuration and operation of DTMF SDB 602 (FIG. 6) is similar to that of DTMF SDB 604, however DTMF SDB 602 monitors signals along communications channel 611 which are bound for switch 601 (FIG. 6), and transmits control messages indicative of detected DTMF triggers to switch 601, via communication link 612.

Figure 8:
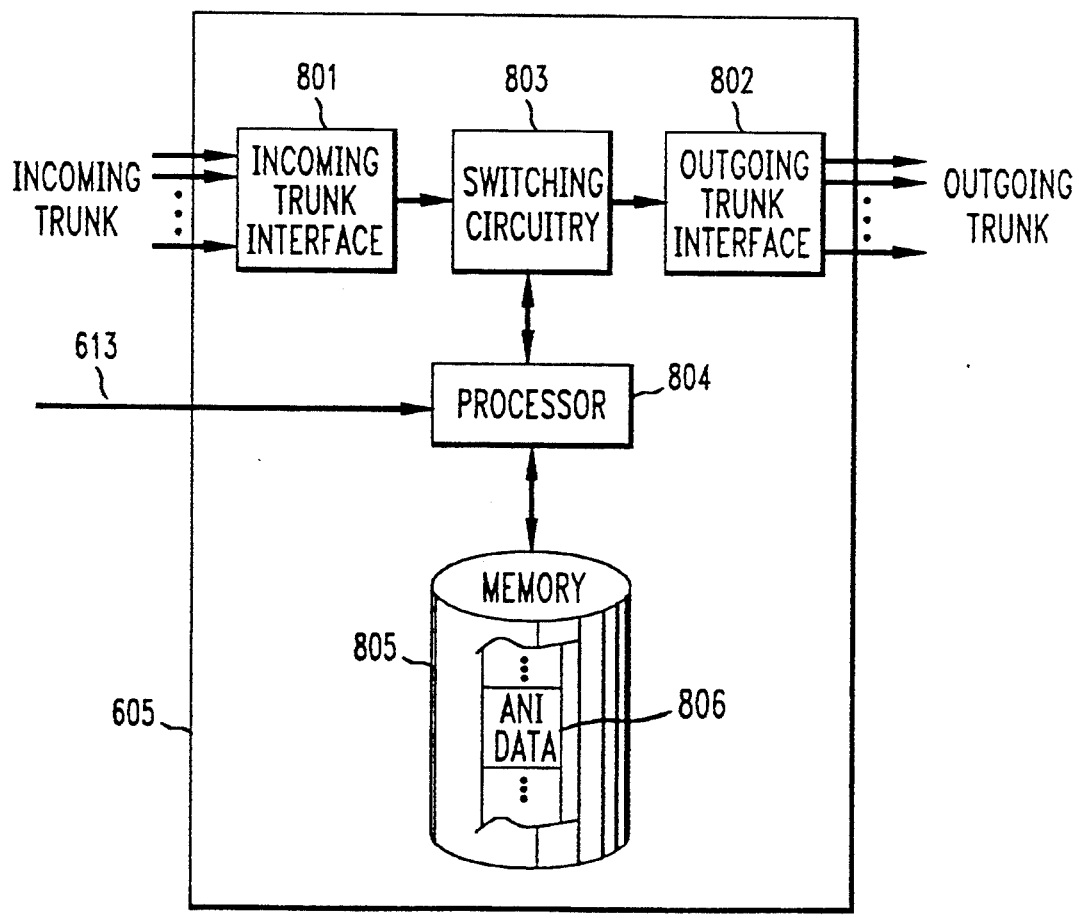
FIG. 8 shows, in simplified block diagram form, the internal architecture of one of the switches of FIG. 5.

Switches 601 and 605 in the above-described network are each program-controlled electronic switching systems. FIG. 8 is a functional block diagram of switch 605 illustrating the basic architecture of the switch. As shown, contained within switch 605 are the following components: incoming trunk interface 801, outgoing trunk interface 802, switching circuitry 803, processor 804, and memory 805. Memory 805 contains a program, the function of which with respect to the invention is described below. Memory 805 also contains call records for maintaining data associated with the various calls being handled by switch 605, and an Automatic Number Identification ("ANI") data base 806. ANI data base 806 contains a listing of the telephone numbers of the network users serviced by switch 605 who subscribe to the DTMF propagation limiting service available within network 600. ANI data base 806 also contains a listing of service profiles for each of these subscribers. Each service profile indicates whether the associated subscriber has requested that DTMF signals be automatically prohibited from propagating to called parties whenever a call is completed. This profile information is programmed into data base 806 to reflect information previously provided by subscribers. Processor 804 is coupled to send and receive information via communication link 613, and signaling system 605. Switch 601 (FIG. 6) has the same basic architecture as switch 605, however, the processor contained within switch 601 receives control messages via communication link 612 (FIG. 6). The 4 ESS ™ switch, is one type of commercially available program-controlled electronic switching system which may be configured as described above.

In practicing a particular method of the invention facilitated by the telecommunication system shown in FIG. 6, network user 608, a subscriber to the DTMF propagation limiting service available within network 600, initiates a call by entering the telephone number associated with network user 610. In a standard manner, switch 601 secures a voice channel voice channel connection to switch 605 as a function of the entered telephone number. However, prior to completing the voice channel connection to network user 610, the programming of switch 605 causes it to wait for the arrival of a profile message from switch 601, via signaling system 606. The time from the completion of a voice channel connection between network user 608 and switch 605, and the time at which a voice channel connection between network user 608 and network user 610 is completed, is the "pre-answer" period. As with all subscribers to the DTMF propagation limiting service, network user 608's telephone number and associated service profile are stored in the ANI data base contained within the serving network switch (in this case, switch 601). Assume that the stored service profile for network user 608 indicates that all DTMF signals should be automatically prohibited from propagating to parties called by user 608 whenever a call is completed.

When the call to network user 610 was initiated by network user 608, an ANI system forwarded the telephone number of network user 608 from LEC 607 to switch 601 in a standard manner. Upon receipt of network user 608's telephone number, switch 601 performs a check of its internal ANI data base to determine if network user 607 is subscribed to the DTMF propagation limiting service. After confirming that this is the case, switch 601 retrieves the service profile associated with user 608 from the ANI data base. Switch 601 then transmits a message reflecting this profile to switch 605, via signaling system 606. In response to the arrival of this profile message, the programming of switch 605 causes an enabling control message to be transmitted from switch 605 to DTMF SDB 604. This control message, which is transmitted via communication link 613, enables DTMF blocker 702, and activates DTMF detector 701. In addition, receipt of the profile message by switch 605, the programming of switch 605 causes the voice channel connection to network user 610 to be completed in a standard manner. All DTMF signals transmitted by network user 608 will be prohibited from reaching network user 610 for the remainder of the call, or until network user 608 transmits a disabling DTMF trigger.

The transmission of a disabling DTMF trigger by network user 608 may be effected at any point during a call. This disabling DTMF trigger is transmitted to DTMF SDB 604 via communications channel 611. In response to detecting this disabling DTMF trigger, DTMF SDB 604 disables any restrictions on the propagation of DTMF signals received via communications channel 611. All DTMF signals transmitted by network user 608 will be allowed to reach network user 610 for the remainder of the call, or until network user 608 transmits an enabling DTMF trigger.

If in the above-described example, network user 608 was a DTMF propagation limiting service subscriber who did not wish for transmitted DTMF signals to be automatically prohibited from propagating to called parties whenever a call was completed, the service profile stored within the ANI data base of switch 601 would have indicated such. When a message reflecting such a service profile was received by switch 605, DTMF blocker 702 (FIG. 7) would not have been enabled. However, DTMF detector 701 (FIG. 7) would still have been activated, and a voice channel connection to network user 610 would still have been completed. All DTMF signals transmitted by network user 608 would have been allowed to reach network user 610 for the remainder of the call, or until network user 608 transmitted an enabling DTMF trigger.

If in the above example, network user 608 did not subscribe to the DTMF propagation limiting service available within network 600, a listing of network user 608's telephone number would not be stored within the ANI data base of switch 601. Consequently, no service profile would be retrieved for network user 608 in response to a call initiated to network user 610. Lacking a service profile, the programming of switch 601 would cause a default profile message to be transmitted to switch 605, and a voice channel connection to network user 610 would be established. However, this default profile signal would not initiate the activation of DTMF detector 701 (FIG. 7), or the enabling of DTMF blocker 702 (FIG. 7). All DTMF signals transmitted by network user 608 would be allowed to reach network user 610 for the remainder of the call, regardless of any DTMF triggers transmitted by network user 608.

In each of the above-described scenarios involving the telecommunication system of FIG. 6, the network user employing the invention was the calling party. However, the invention may be practiced by the called party (network user 610 in above examples). Assume that network user 610 is a subscriber to the DTMF propagation limiting service available from network 600, and that the service profile stored within switch 605 indicates that network user 610 has requested that all DTMF signals be automatically prohibited from propagating to calling parties. Upon effecting a voice channel connection to network user 610, switch 605 is programmed to perform a check of its internal ANI data base to determine if the called number (the number associated with network user 610) is that of a subscriber. After confirming that this is the case, switch 605 retrieves the service profile associated with user 610 from ANI data base 806 (FIG. 8). Switch 605 then transmits a message reflecting this profile to switch 601, via signaling system 606. In response to the arrival of this profile message, the programming of switch 601 enables the DTMF blocker, and activates the DTMF detector within DTMF SDB 602. All DTMF signals transmitted by network user 610 will be prohibited from reaching network user 608 for the remainder of the call, or until network user 610 transmits a disabling DTMF trigger. Naturally, the service profile of any given called party may instruct the appropriate DTMF SDB to automatically provide whatever combinations of DTMF blocking and DTMF tone detection that called party desires.

In the examples of the invention discussed with respect to the network of FIG. 6, all DTMF blocking associated with a voice channel connection supporting a call is disabled upon termination of that call. This is facilitated as a function of the programming of the switches within network 600. When a call is terminated, the switch serving the calling party, and the switch serving the called party, each transmit a termination control message their associated DTMF SDB. This terminating control message instructs the DTMF blocker within the DTMF SDB to disable DTMF blocking.

Figure 9:
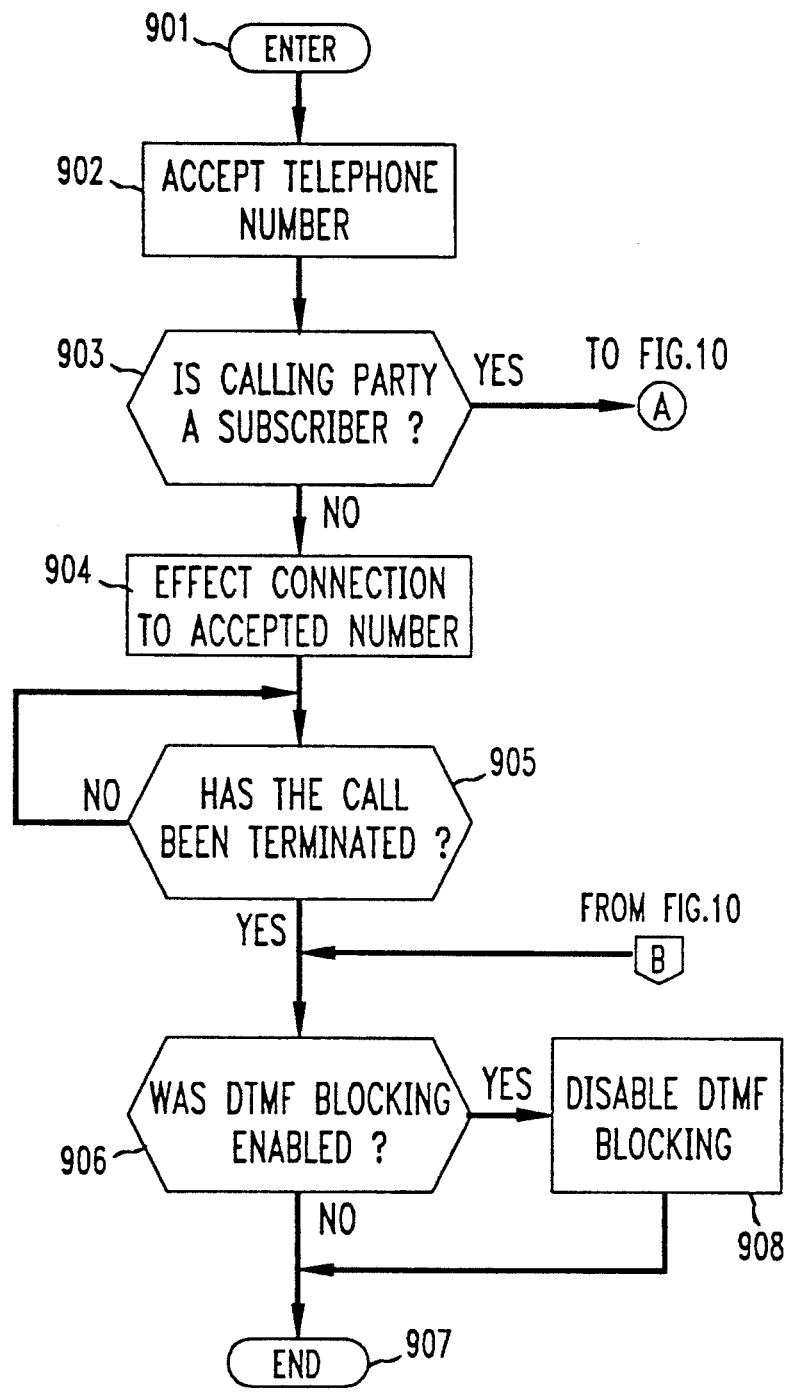
FIGS. 9 and 10 form a flow diagram of operations required to enable a calling party to selectively control the propagation of DTMF signals within the telecommunication system of FIG. 6.
Figure 10:
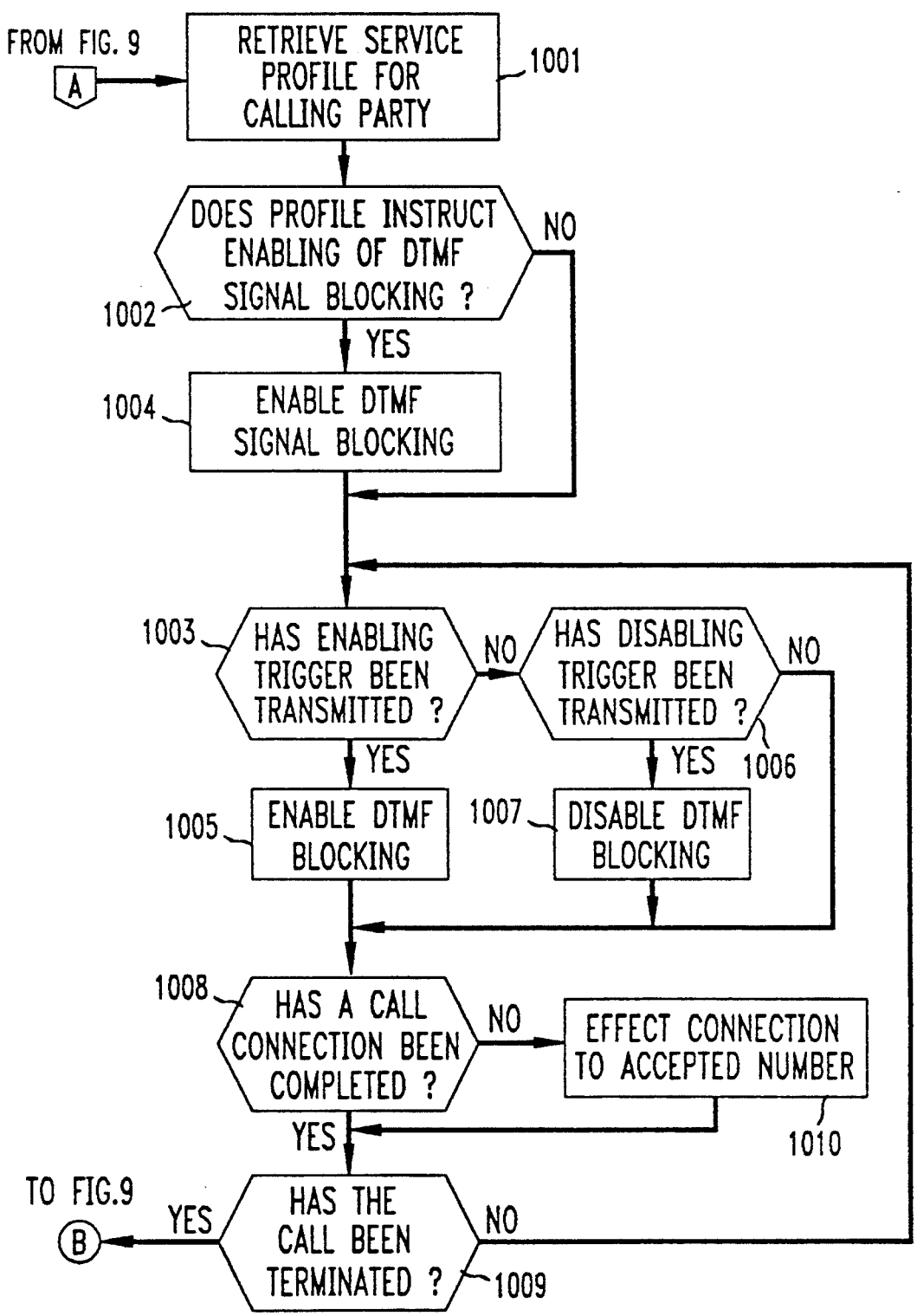

FIGS. 9 and 10 together form a flow diagram illustrating the sequence of operations effected within network 600 in providing the controllable DTMF propagation limiting service described above to a calling party. As shown in FIG. 9, the sequence is entered into via step 901. Thereafter, a voice channel connection is initiated in operational block 902 by accepting the telephone number of the called party from the calling party. Conditional branch point 903 tests to determine if the calling party is a subscriber to the DTMF propagation limiting service. If a test result of NO is obtained, then a voice channel connection is effected in operational block 904. Operational block 904 branches to conditional branch point 905 which tests if the call has been terminated. If the call is still in progress (a test result of NO), the operation branches to conditional branch point 905. If a test result of YES in step 905 is returned, conditional branch point 906 tests if DTMF blocking had been enabled as of call termination. If this test result is NO, the operation is exited via step 907. If the result of the test in step 906 is YES, DTMF blocking is disabled in operational block 908, and then operation is terminated via step 907.

As is shown in FIG. 9, if the conditional test of branch point 903 returns a YES (the calling party is a subscriber), the operation branches to operational block 1001 of FIG. 10. Operational block 1001 retrieves the service profile for the calling party, and branches to conditional branch point 1002 which tests to determine if the retrieved service profile calls for the enabling of DTMF blocking. If a test result of NO is returned, the operation branches to conditional branch point 1003. If the test result of YES is obtained in step 1002, DTMF blocking is enabled in operational block 1004, which branches to conditional branch point 1003. Conditional branch point 1003 tests to determine if the enabling DTMF trigger has been transmitted by the calling party. If the test result is YES, DTMF blocking is enabled in operational block 1005. If the test result is NO, conditional branch point 1006 tests to determine if the disabling DTMF trigger has been transmitted by the calling party. If the test result is YES, DTMF blocking is disabled in operational block 1007. If the test result in step 1008 is NO, the operation continues with conditional branch point 1008; operational blocks 1005 and 1007 also branch to conditional branch point 1008. Conditional branch point 1008 tests if a voice channel connection to the called party has been completed. If a call is in progress (a test result of YES), the operation branches to conditional branch point 1009. If the test result is NO, a voice channel connection to the called party is effected by operational block 1010, which branches to conditional branch point 1009. Conditional branch point 1009 determines if the call has been terminated. If the call is still in progress (a test result of NO), the operation branches to conditional branch point 1003. If a test result of YES is returned, the operation branches to conditional branch point 906 (FIG. 9)

Figure 11:
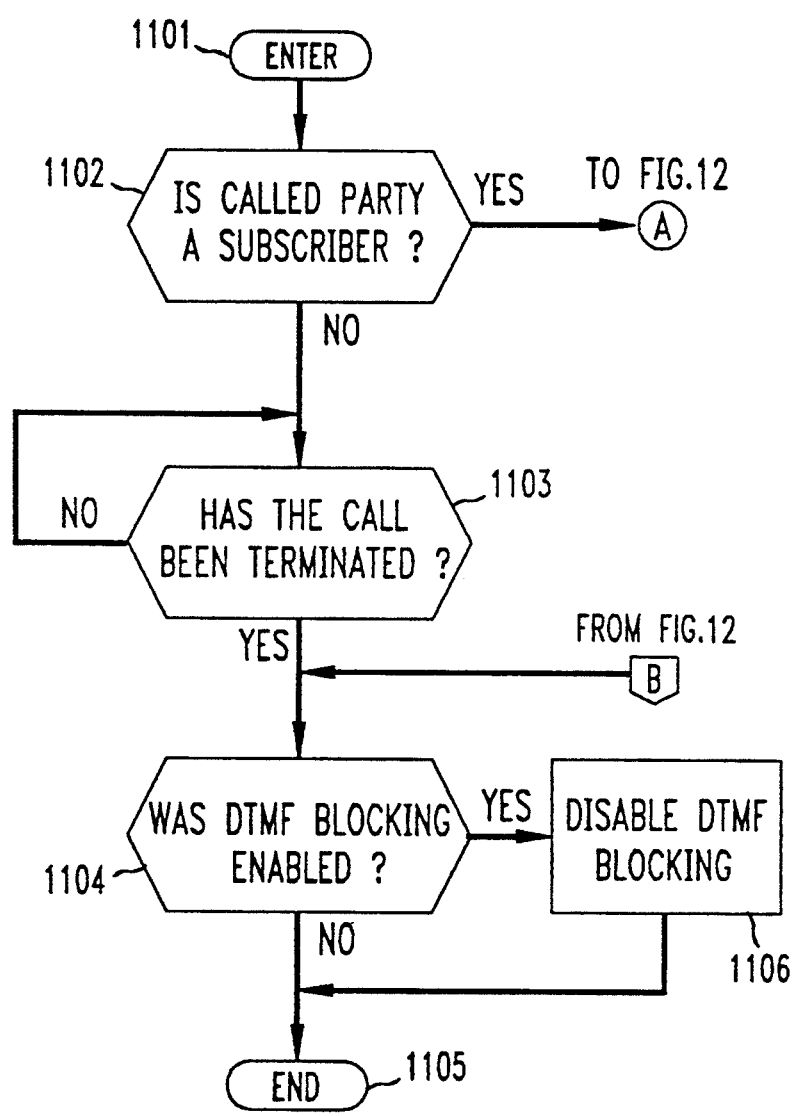

FIGS. 11 and 12 illustrate the sequence of operations effected within network 600 in providing the controllable DTMF propagation limiting service described above to a called party. As shown in FIG. 11, the sequence is entered into via step 1101, and then conditional branch point 1102 tests to determine if the called party is a subscriber to the DTMF propagation limiting service. If a test result of NO is obtained, then conditional branch point 1103 tests if the call has been terminated. If the call is still in progress (a test result of NO), the operation branches to conditional branch point 1103. If a test result of YES is returned in step 1103, conditional branch point 1104 tests if DTMF blocking had been enabled as of call termination. If this test result is NO, the operation is exited via step 1105. If the result of the test in step 1104 is YES, DTMF blocking is disabled in operational block 1106, and then operation is terminated via step 1105.

As shown if FIG. 11, if the conditional test of branch point 1102 returns a YES (the called party is a subscriber), the operation branches to operational block 1201 of FIG. 12. Operational block 1201 retrieves the service profile for the called party from the ANI data base, and branches to conditional branch point 1202 which tests to determine if the retrieved service profile calls for the enabling of DTMF blocking. If a test result of NO is returned, the operation branches to conditional branch point 1203. If the test result of YES is obtained in step 1202, DTMF blocking is enabled in operational block 1204, which branches to conditional branch point 1203. Conditional branch point 1203 tests to determine if the enabling DTMF trigger has been transmitted by the called party. If the test result is YES, DTMF blocking is enabled in operational block 1205. If the test result is NO in step 1203, conditional branch point 1206 tests to determine if the disabling DTMF trigger has been transmitted by the called party. If the test result is YES, DTMF blocking is disabled in operational block 1207. If the test result is NO in step 1206, the operation continues with conditional branch point 1208; operational blocks 1205 and 1207 also branch to conditional branch point 1208. Conditional branch point 1208 tests if the call has been terminated. If the call is still in progress (a test result of NO), the operation branches to conditional branch point 1203. If a test result of YES is returned in step 1208, the operation branches to conditional branch point 1104 (FIG. 11)

The above-described invention provides a practical method for controllably controlling the propagation of DTMF signals within a network. It will be understood that the particular methods described are only illustrative of the principles of the present invention, and that various modifications could be made by those skilled in the art without departing from the scope and spirit of the present invention, which is limited only by the claims that follow.

One such modification would include situating the DTMF SDB associated with an originating or terminating switch on the egress side of the switch. This would allow the terminating switch to receive DTMF signals from a network user practicing the invention, while enabling DTMF signals to be blocked from reaching parties with whom the network user was connected to via the switch. A single DTMF SDB might also be modified to provide DTMF blocking for both the calling and called parties. Other modifications might involve incorporating the tone detection and blocking functions of the DTMF SDB within a switch, or performing these functions via a device adjunct to a switch, instead of via a device in-line with a switch. Still other modifications might include services wherein a verbal command serves as the audible prompt indicating to a network user that DTMF triggers may be keyed in.

Modifications of the manner in which an ANI data base is employed with the invention may also be envisioned. Systems could be programmed to alter the type of DTMF blocking provided to a subscriber based upon the number which the subscriber was calling, or based upon the number of the party calling the subscriber.

I claim:

1. A method for selectively controlling the propagation of dual-tone multi-frequency signals along a communications channel within a telecommunication network, comprising the steps of:

monitoring the communications channel to detect, during a pre-answer period of a call initiated from a first network user to a second network user supported by the communications channel, one or more dual-tone multi-frequency signals transmitted along said communications channel by said first network user; and prohibiting, in response to detection of a specific one or more dual-tone multi-frequency signals, all dual-tone multi-frequency signals subsequently transmitted along said communications channel by said first network user from being propagated to said second network user, while permitting the propagation of all other voice channel audio signals subsequently transmitted along said communication channel from said first network user to said second network user.

2. A method for selectively controlling the propagation of dual-tone multi-frequency signals along a communications channel within a telecommunication network, comprising the steps of:

monitoring the communications channel to detect, during a pre-answer period of a call initiated from a first network user to a second network user supported by the communications channel, one or more dual-tone multi-frequency signals transmitted along said communications channel by said first network user;

prohibiting, in response to detection of a specific one or more dual-tone multi-frequency signals transmitted along said communications channel by said first network user, all dual-tone multi-frequency signals subsequently transmitted along said channel by said first network user from being propagated to said second network user;

monitoring the communications channel to detect, after a call supported by the communications channel is completed between said first network user to said second network user, one or more dual-tone multi-frequency signals transmitted along said communications channel by said second network user; and prohibiting, in response to detection of a specific one or more dual-tone multi-frequency signals transmitted along said communications channel by said second network user, all dual-tone multi-frequency signals subsequently transmitted along said channel by said second network user from being propagated to said first network user.

3. A method for selectively controlling the propagation of dual-tone multi-frequency signals along a communications channel within a telecommunication network, comprising the steps of:

monitoring the communications channel to detect, during a pre-answer period of a call initiated from a first network user to a second network user supported by the communications channel, one or more dual-tone multi-frequency signals transmitted along said communications channel by said first network user;

prohibiting, in response to detection of a first specific one or more dual-tone multi-frequency signals transmitted along said communications channel by said first network user, all dual-tone multi-frequency signals subsequently transmitted along said channel by said first network user from being propagated to said second network user;

monitoring the communications channel to detect, after a call supported by the communications channel is completed between said first network user to said second network user, one or more dual-tone multi-frequency signals transmitted along said communications channel by said first network user, and allowing, in response to detection of a second specific one or more dual-tone multi-frequency signals transmitted along said communications channel by said first network user, all dual-tone multi-frequency signals subsequently transmitted along said channel by said first network user to propagate to said second network user.

4. The invention of claim 3 further characterized by prohibiting the propagation of all dual-tone multi-frequency signals transmitted along said channel by said first network user to said second network user, in response to the detection of the transmission of said first specific one or more dual-tone multi-frequency signal by said first network user after said call connection between said first network user and said second network user has been established.

5. The invention of claim 3 further characterized by prohibiting the propagation of all dual-tone multi-frequency signals transmitted along said channel by said second network user to said first network user, in response to the detection of the transmission of said first specific one or more dual-tone multi-frequency signal by said second network user after said call connection between said first network user and said second network user has been established.

6. The invention of claim 5 further characterized by allowing the propagation of all dual-tone multi-frequency signals transmitted along said channel by said second network user to said first network user, in response to the detection of the transmission of said second specific one or more dual-tone multi-frequency signal by said second network user after said call connection between said first network user and said second network user has been established.

7. A method for selectively controlling the propagation of dual-tone multi-frequency signals along a communications channel within a telecommunication network, comprising the steps of:

receiving, via said telecommunication network, during a pre-answer period of a call initiated from a first network user to a second network user supported by the communications channel, an identifying signal associated with said first network user; and prohibiting, in response to said received identifying signal, all dual-tone multi-frequency signals subsequently transmitted along said communications channel by said first network user from being propagated to said second network user, while permitting the propagation of all other voice channel audio signals subsequently transmitted along said communication channel from said first network user to said second network user.

8. The invention of claim 7 further characterized by:

monitoring the communications channel to detect, after a call supported by the communications channel is completed between said first network user to said second network user, one or more dual- tone multi-frequency signals transmitted along said communications channel by said first network user;

allowing, in response to said detection of a first specific one or more dual-tone multi-frequency signals transmitted along said communications channel by said first network user, all dual-tone multi-frequency signals subsequently transmitted along said channel by said first network user to propagate to said second network user; and prohibiting, in response to said detection of a second specific one or more dual-tone multi-frequency signals transmitted along said communications channel by said first network user, all dual- tone multi-frequency signals subsequently transmitted along said channel by said first network user from being propagated to said second network user.

9. A method for selectively controlling the propagation of dual-tone multi-frequency signals along a communications channel within a telecommunication network, comprising the steps of:

receiving, via said telecommunication network, during a pre-answer period of a call initiated from a first network user to a second network user supported by the communications channel, an identifying signal associated with said second network user; and prohibiting, in response to said received identifying signal, all dual-tone multi-frequency signals subsequently transmitted along said communications channel by said second network user from being propagated to said first network user, while permitting the propagation of all other voice channel audio signals subsequently transmitted along said communication channel from said second network user to said first network user.

10. The invention of claim 9 further characterized by:

monitoring the communications channel to detect, after a call supported by the communications channel is completed between said first network user to said second network user, one or more dual-tone multi-frequency signals transmitted along said communications channel by said second network user;

allowing, in response to said detection of a first specific one or more dual-tone multi-frequency signals transmitted along said communications channel by said second network user, all dual-tone multi-frequency signals subsequently transmitted along said channel by said second network user to propagate to said first network user; and prohibiting, in response to said detection of a second specific one or more dual-tone multi-frequency signals transmitted along said communications channel by said second network user, all dual-tone multi-frequency signals subsequently transmitted along said channel by said second network user from being propagated to said first network user.

11. A method for selectively controlling the propagation of dual-tone multi-frequency signals along a communications channel within a telecommunication network, comprising the steps of:

receiving, via said telecommunication network, during a pre-answer period of a call initiated from a first network user to a second network user supported by the communications channel, an identifying signal associated with said first network user;

receiving, via said telecommunication network, during a pre-answer period of a call initiated from a first network user to a second network user supported by the communications channel, an identifying signal associated with said second network user; and prohibiting all dual-tone multi-frequency signals subsequently transmitted along said communications channel by said first network user from being propagated to said second network user as a function of both received identifying signals, while permitting the propagation of all other voice channel audio signals subsequently transmitted along said communication channel from said first network user to said second network user.

12. The invention of claim 11 further characterized by:

monitoring the communications channel to detect, after a call supported by the communications channel is completed between said first network user to said second network user, one or more dual-tone multi-frequency signals transmitted along said communications channel by said first network user;

allowing, in response to said detection of a first specific one or more dual-tone multi-frequency signals transmitted along said communications channel by said first network user, all dual-tone multi-frequency signals subsequently transmitted along said channel by said first network user to propagate to said second network user; and prohibiting, in response to said detection of a second specific one or more dual-tone multi-frequency signals transmitted along said communications channel by said first network user, all dual-tone multi-frequency signals subsequently transmitted along said channel by said first network user from being propagated to said second network user.

13. A method for selectively controlling the propagation of dual-tone multi-frequency signals along a communications channel within a telecommunication network, comprising the steps of:

receiving, via said telecommunication network, during a pre-answer period of a call initiated from a first network user to a second network user supported by the communications channel, an identifying signal associated with said first network user;

receiving, via said telecommunication network, during a pre-answer period of a call initiated from a first network user to a second network user supported by the communications channel, an identifying signal associated with said second network user; and prohibiting all dual-tone multi-frequency signals subsequently transmitted along said communications channel by said second network user from being propagated to said first network user as a function of both received identifying signals, while permitting the propagation of all other voice channel audio signals subsequently transmitted along said communication channel from said second network user to said first network user.

14. The invention of claim 13 further characterized by:

monitoring the communications channel to detect, after a call supported by the communications channel is completed between said first network user to said second network user, one or more dual-tone multi-frequency signals transmitted along said communications channel by said second network user;

allowing, in response to said detection of a first specific one or more dual-tone multi-frequency signals transmitted along said communications channel by said second network user, all dual-tone multi-frequency signals subsequently transmitted along said channel by said second network user to propagate to said first network user; and prohibiting, in response to said detection of a second specific one or more dual-tone multi-frequency signals transmitted along said communications channel by said second network user, all dual-tone multi-frequency signals subsequently transmitted along said channel by said second network user from being propagated to said first network user.

* * * * *